United States Patent [19]

Sinko

[11] Patent Number: 5,378,446
[45] Date of Patent: Jan. 3, 1995

[54] CORROSION PREVENTIVE ZINC CYANAMIDE AND METHOD

[75] Inventor: John Sinko, Glendale, Wis.

[73] Assignee: Wayne Pigment Corporation, Milwaukee, Wis.

[21] Appl. No.: 195,783

[22] Filed: Feb. 14, 1994

Related U.S. Application Data

[63] Continuation-in-part of Ser. No. 994,768, Dec. 22, 1992, abandoned, and a continuation-in-part of Ser. No. 802,855, Dec. 6, 1991, Pat. No. 5,176,894.

[51] Int. Cl.⁶ ................................................. C01C 3/16
[52] U.S. Cl. ..................................... 423/368; 106/419
[58] Field of Search ......................... 106/419; 423/368

[56] References Cited

U.S. PATENT DOCUMENTS 1,948,106  2/1934  Frank ................................... 423/368
5,176,894  1/1993  Sinko ................................... 423/368
5,314,532  5/1994  Hughes et al. ....................... 106/419

FOREIGN PATENT DOCUMENTS 905959  9/1962  United Kingdom .

*Primary Examiner*—Wayne Langel
*Attorney, Agent, or Firm*—Ryan, Kees & Hohenfeldt

[57] ABSTRACT

Improved corrosion preventive pigment grade zinc cyanamide suitable for protective coatings is prepared by providing a hydrated slurry of finely divided, dispersed basic zinc carbonate, mixing with said slurry a stabilized soluble aqueous solution of hydrogen cyanamide to form zinc cyanamide having a crystalline structure characterized by the presence of an intense IR absorption spectral band at 2200 cm$^{-1}$ and the substantial absence of component bands at 2050 cm$^{-1}$ and 700 cm$^{-1}$.

11 Claims, 1 Drawing Sheet

CORROSION PREVENTIVE ZINC CYANAMIDE AND METHOD

This is a continuation-in-part of copending application(s) Ser. No. 07/994,768 filed on Dec. 22, 1992 now abandoned and a continuation-in-part of application Ser. No. 802,855 filed Dec. 6, 1991, now U.S. Pat. No. 5,176,894 issued Jan. 5, 1993.

FIELD OF THE INVENTION

The present invention relates to improved grades of zinc cyanamide. More specifically, the invention relates to pigment grade zinc cyanamide of improved quality suitable for use as a corrosion retardant component in protective paints such as those used for mirror backing.

BACKGROUND ART

The present invention relates to a pigment grade zinc cyanamide and manufacturing procedure, characterized by high assay, accordingly high corrosion inhibitive activity and more particularly, however, by crystal structure and properties substantially different from those of the prior art.

Zinc cyanamide is known in the prior art for its valuable corrosion inhibiting properties and its applicability as a pigment component of primer formulations and, specifically, in mirror backing protective coatings employed on metallic silver substrates. Pigment grade qualities are preferably produced by wet procedures which yield products characterized usually by high assay, uniform and narrow particle size distribution, high specific surface area and, consequently, by enhanced corrosion inhibitive activity in protective coatings.

Basically, there are two versions of wet manufacturing procedures known by the prior art: By precipitation, ZnNCN can be produced according as follows:

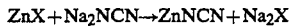   1.

Where ZnX is soluble, preferably $ZnSO_4$ and eventually $Na_2NCN$ is prepared "in situ" by $H_2NCN$ and NaOH addition.

If performed in ammoniacal medium, due to the presence of ammonium salts formed as byproducts, the ZnNCN precipitation occurs incompletely and as a consequence, the resulting process waters are environmentally incompatible, according to the following equilibrium:

   2.

It is known that generally the presence of soluble salt contaminants severely affects the quality of inhibitor pigment grade products. Consequently, the formation of soluble byproducts (See Equations 1 and 2) constitutes a considerable shortcoming of manufacturing procedures based on precipitation reactions.

The above mentioned shortcomings are avoided by procedures based on heterogeneous processes, as for example, the direct conversion of hydrated zinc oxide into zinc cyanamide, pursuant to the following:

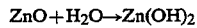   3.

   4.

Reaction 4 takes place on the solid-liquid interface, presumably by a nucleophilic attack of the $^{2(-)}NCN$ anion which does form under the mildly alkaline conditions of the $Zn(OH)_2$ slurry.

Pigment grade ZnNCN applicable in protective coatings (i.e., mirror backing) is obtainable with high assay and virtually soluble salt-free conditions according to such direct procedure disclosed by U.S. Pat. No. 5,176,894.

Corrosion, even of coated metal surfaces, is a thermodynamically favored electrochemical process supported by moisture, always present in organic coatings at equilibrium with the humidity of the surroundings. In such conditions, diffusion controlled transport processes of available soluble species occur continuously between all involved interfaces of the substrate/coating system. Such soluble species transported by diffusion processes are generally airborne corrosion promoters or may be generated "in situ" by soluble components of the coating system.

In reference to ZnNCN, it is the $=N-C=N$ moiety of the pigment composition which, by continuous solubilization, generates the electrochemically active species characterized by substrate-specific inhibitor activity displayed, as for example, on silver. By contrast, if soluble inorganic salt contaminants accompany the host pigment, corrosion promoter ionic species are generated "in situ" which tend to obliterate the protective effect of the inhibitor. Consequently, it becomes evident that high assay and soluble salt-free conditions are necessary quality requirements for pigment grade zinc cyanamides intended for protective coating formulations. However, in addition to chemical quality parameters, several physical parameters need to be considered in characterizing such valuable end-use properties of pigment grade products as rheological behavior in paint systems and, specifically, corrosion inhibitive activity.

Considering the dynamic nature of the corrosion process, it is important to specify that the necessary condition of effective corrosion inhibition is to maintain a critical or higher dynamic equilibrium concentration of inhibitor species at the coating-substrate interface all during the useful service life of the protective coating system. In this sense, corrosion inhibitive pigments as functional components of protective coating systems, can be regarded as solid reservoirs which, by moisture supported solubilization, at an adequate rate, continuously generate "in situ" electrochemically active inhibitor species.

It is evident that corrosion inhibitive activity should be considered as a water solubility or solubility rate dependent, discriminant property of electrochemically active pigment grade products. Virtually insoluble or very soluble compounds, although of potentially adequate chemical composition, cannot function as such, however, for different reasons: lack of any inhibitive activity of the former, and due to increase of the coating's water sensitivity by the latter.

Contrary to related basic physical constants, several functional properties (i.e.: rheological characteristics, corrosion inhibitive activity) of pigment grade bulk solids are highly dependent on their variable physical conditions, determined by such microscopic qualities as particle size distribution, surface modification circumstances and, specifically, by crystal morphological characteristics. Controlled alterations of bulk solids' physical conditions which usually result in measurable value variations of such related macroscopic parameters as oil absorption, apparent bulk density and notable solubilization rate, are common practices of advanced pigment manufacturing technologies.

In this respect, alteration of crystal morphological characteristics, such as augmenting crystallite acicularity (which results in increased specific surface area and oil absorption, respectively in decreased apparent bulk density values), offers attractive possibilities to condition solubility rate, as well as the related inhibitive activity of corrosion retardant pigment grade products.

SUMMARY OF THE INVENTION

An important object of the present invention refers to an inhibitor pigment grade zinc cyanamide and manufacturing procedure characterized by high assay, soluble salt contaminant free condition and, more specifically, by crystal morphological characteristics, related structure and habit which are considerably different from pigment grade zinc cyanamides known by the prior art.

Briefly summarized, the present invention achieves it objects by providing improved corrosion preventive pigment grade zinc cyanamide suitable for protective coatings prepared by providing a hydrated slurry of finely divided, dispersed basic zinc carbonate, mixing with said slurry a stabilized soluble aqueous solution of hydrogen cyanamide to form zinc cyanamide having a crystalline structure characterized by the presence of an intense IR absorption spectral band at 2200 cm$^{-1}$ and the substantial absence of such component bands at 2050 cm$^{-1}$ and 700 cm$^{-1}$.

Zinc cyanamide, as known by the prior art, produced by precipitation or ZnO conversion as above-disclosed, unequivocally presents the same monoclinic crystal system and essentially one and the same crystal structure. As a function of the employed manufacturing procedure, however, various grades of prior art ZnNCN are of widely variable quality, as seen in Table 1. Comparatively high apparent bulk density values of 57–65 g/100 cm$^3$ (See also, Table 3 for comparison) are as well typical for such variety of pigment grade ZnNCN.

TABLE 1

| Quality Parameters | Typical Values |
| --- | --- |
| Assay % | 80–96 |
| Inclusion ZnO % | 15–1 |
| Crystal H$_2$O % | 4–6 |
| Soluble Salt Contaminants % | 0.05–1.0 |
| Specific Gravity | 2.8–2.9 |
| Oil Absorption, lbs/100 lbs | 33–36 |
| Apparent Bulk Density, g/100 cm$^3$ | 57–65 |

The IR spectrum presented in FIG. 1 is characteristic for the crystal structure of prior art ZnNCN produced whether by precipitation in ammoniacal medium (See Reaction 2) or by ZnO conversion pursuant to U.S. Pat. No. 5,176,894. Typical features of IR spectrums relevant to ZnNCN structures are the N—C≡N group's deformation doublet band and the —C≡N group's vibrational triplet band located in the 680–700 cm$^{-1}$ and the 2050–2200 cm$^{-1}$ regions, respectively. However, the notable and specific spectral details characteristic for the prior art zinc cyanamide crystal structure (which for convenience is hereinafter referred to as "normal" structure) are observable in the component absorption bands' relative intensities. In this sense, the comparatively high intensity of the component band located at 2050 cm$^{-1}$ and the absence of any component band at 2200 cm$^{-1}$ are characteristic. The relatively intense component band, typically present at approximately 2100 cm$^{-1}$, is not relevant in this respect.

DETAILED DESCRIPTION

Quite unexpectedly, it was discovered that ZnNCN produced according to the present invention appears as a solid phase in the expected monoclinic crystal system, having, however, crystal structure (hereinafter referred to as "altered" structure) and properties considerably different from the above-described "normal" structure.

Such variety of pigment grade ZnNCN, if produced under optimal circumstances, is typically characterized by high assay, remarkably low ZnO and ZnCO$_3$ inclusion content, essentially soluble salt-free conditions and more distinctively, by comparatively low apparent bulk density values (32–42 g/100 cm$^3$) as shown in Table 3.

Figure 2:
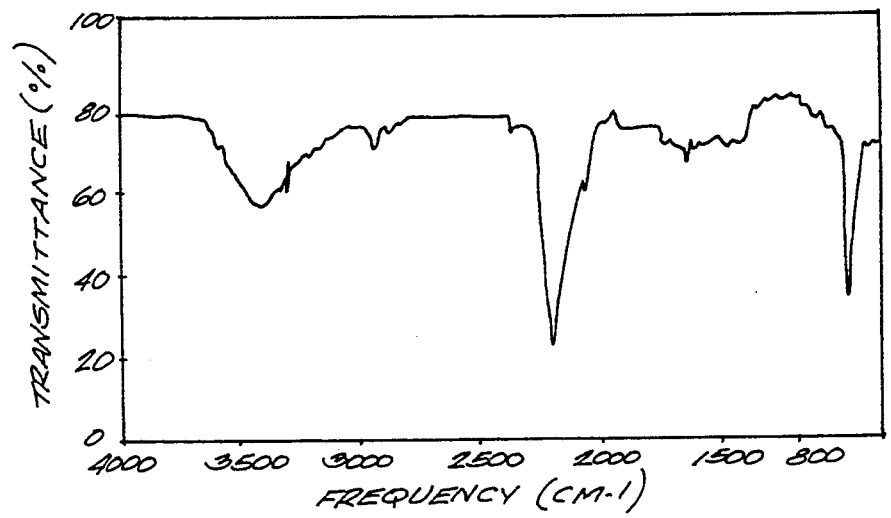
FIG. 2 is an IR spectrum of ZnNCN characterized by "altered" crystal structure.

IR spectrum of ZnNCN characterized by "altered" crystal structure (See FIG. 2) presents the expected two sets of absorption bands as above-specified, which are significantly different, however, in respect to the component bands' relative intensities, from characteristic for ZnNCN of "normal" crystal structure. intensities, from characteristic for ZnNCN of "normal" crystal structure.

Comparatively, the observable prominent differences which distinctively relate to ZnNCN, characterized by "altered" crystal structure provided by this invention, consist in the presence of the intense component band located at 2200 cm$^{-1}$ and the virtual absence of component bands at 2050 cm$^{-1}$ and 700 cm$^{-1}$. According to the present invention, zinc cyanamide characterized by the above-described "altered" crystal structure, respectively by IR spectrum as presented in FIG. 2, can be produced by variations of the heterogeneous reaction schematically presented below:

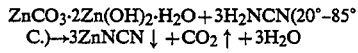

$$ZnCO_3 \cdot 2Zn(OH)_2 \cdot H_2O + 3H_2NCN (20°-85° C.) \rightarrow 3ZnNCN \downarrow + CO_2 \uparrow + 3H_2O \qquad 5.$$

It can be seen that basic zinc carbonate, which is the specific reactant of the process pursuant to the present invention, reacts with H$_2$NCN in aqueous medium, even at ambient temperatures, according to a typical reaction of substitution, resulting under optimal circumstances in practically quantitative CO$_2$ elimination and ZnNCN formation.

It is important to observe, however, that by considering the relative strength of the acids involved (K$_1$=0.45×10$^{-6}$ for H$_2$CO$_3$ and K=4.04×10$^{-11}$/20° C. for H$_2$NCN) the occurrence of Reaction 5 is unexpected. On the contrary, and consistent with the above-presented theoretical considerations, there are known H$_2$NCN manufacturing procedures which successfully exploit the relatively stronger acidity of H$_2$CO$_3$ according to the following reaction:

$$CO_2 + H_2O + CaNCN \rightarrow CaCO_3 \downarrow + H_2NCN \qquad 6.$$

Consequently, based on common theoretical considerations, the possibility of the occurrence of As for particularity of Reaction 5, pertinent to the resultant ZnNCN crystal structure, the carbonate constituent of the solid phase can be suspected as the structure-specific component of the system: while evidently consumed in the process (along with the related ZnO constituent), the carbonate constituent apparently displays a specific "template" effect by promoting the formation of ZnNCN having "altered" crystal structure and properties.

As above specified, the specific raw material of the manufacturing process of the present invention or precursor of zinc cyanamide characterized by "altered" structure, is basic zinc carbonate, which, according to Aldrich Chemical Co., corresponds to $ZnCO_3 \cdot 2Zn(OH)_2 \cdot H_2O$ and contains 36.6% $ZnCO_3$.

This material, a white crystalline powder, is available on the market (from Aldrich Chemical Co. or Mineral Research and Development Co.) but with inconsistent quality, characterized by variable (of about 40–43%) $ZnCO_3$ content, specific surface area values and consequently by variable reactivity; at typical 43% $ZnCO_3$ and 58.5% Zn contents, it corresponds to $ZnCO_3 \cdot 1.6Zn(OH)_2 \cdot 0.3H_2O$.

Regarding the quality of the ZnNCN produced, basically determined by the achievable extent of completion of Reaction 5, it was observed that a well dispersed and hydrated basic zinc carbonate suspension, characterized by high value of the solid phase's specific surface area, is preferable. Such product, if subject to the process conditions at 70°–85° C. yields ZnNCN of "altered" structure, characterized by assay of about 80–81%, 4–6% $ZnCo_3$ and 8–10% ZnO inclusion content (See structure, characterized by assay of about 80–81%, 4–6% $ZnCo_3$ and 8–10% ZnO inclusion content (See Table 3, Example 1).

It will be noted that generally $ZnCO_3$ and ZnO are tolerable inclusions in pigment grade ZnNCN, but, for obvious reasons, at as low content levels as possible. It is important to observe in this respect, that although Reaction 5 occurs readily at ambient temperature conditions, elevated temperatures of 70°–85° C. are preferred due to comparatively lower $ZnCo_3$ inclusion contents of the resultant ZnNCN.

In order to minimize the final product's carbonate content, variations of Reaction 5 were studied, carried out on well dispersed and hydrated $ZnO/ZnCO_3$ precursor suspensions, characterized by high values of specific surface area and, more importantly, containing variable amount of, "in situ" freshly formed $ZnCO_3$.

Freshly precipitated $ZnCO_3$ was conveniently formed in ZnO suspension by its partial solubilization in $H_2SO_4$ and subsequent $Na_2CO_3$ addition, as follows:

$$ZnO \cdot H_2O + XH_2SO_4 \rightarrow (1-x)ZnO \cdot H_2O + XZn^{2+} + XSO_4^{2-} \qquad 7.$$

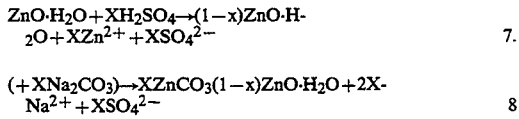
$$(+XNa_2CO_3) \rightarrow XZnCO_3(1-x)ZnO \cdot H_2O + 2XNa^{2+} + XSO_4^{2-} \qquad 8$$

Quite surprisingly, it was observed that $ZnO/ZnCO_3$ freshly formed precursors display "template" effects at substantially lower than the proven 38–43% $ZnCO_3$ content typical for basic zinc carbonates of commercial grades. According to Reactions 7 and 8, at X≃0.1 minimum, the $ZnO/ZnCO_3$ suspension's $ZnCO_3$ content was found to be about 12.5%. Such precursor, if subjected to conditions according to Reaction 5, yields ZnNCN of "altered" structure, characterized by assays of 80–85%, and by manifestation of efficient "template" effect at such low carbonate content levels indicates a presumably uniform repartition of the carbonate phase at the precursor's solid-liquid interface. The formation of soluble by-products (See Reaction 6.) constitutes, however, a considerable shortcoming of the above-disclosed procedure.

$CO_2$ gas introduction was thus found to be the preferable alternative process for precursor preparation, pursuant to the present invention. This process results in an "in situ" freshly precipitated $ZnCO_3$ phase in a uniformly distributed state at the solid-liquid interface of the ZnO suspension. If the $CO_2$ gas introduction is carried out to saturation preferably but not necessarily at ambient temperatures, a well hydrated and dispersed ZnO suspension is readily convertible (without by-product formation) to basic zinc carbonate according to the known reaction, as follows:

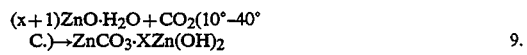
$$(x+1)ZnO \cdot H_2O + CO_2(10°–40° C.) \rightarrow ZnCO_3 \cdot XZn(OH)_2 \qquad 9.$$

Where x=0.22–0.14, corresponding to as high as 85–90% $ZnCO_3$ content of the solid phase.

Experimentally, it was found, however, that such freshly prepared (by $CO_2$ saturation) basic zinc carbonate suspension (the $ZnCO_3/ZnO/CO_2/H_2O$ system) is unstable, and as the $CO_2$ introduction is discontinued, the system's $ZnCO_3$ content decreases spontaneously in time at ambient temperature, to about 68–72%. Furthermore, it was learned pursuant to the present invention, that by heating it to 75°–85° C. (as preferred according to the present invention, see Examples 2 and 3), the suspension's solid phase's $ZnCO_3$ content stabilizes at about 55–57%. This content corresponds approximately to $ZnCO_3 \cdot Zn(OH)_2$, which, according to the present 57%. This content corresponds approximately to $ZnCO_3 \cdot Zn(OH)_2$, which, according to the present invention, is considered the actual composition of the "$CO_2$ saturated" $ZnCO_3/ZnO$ suspension's solid phase. Finally, by dehydration at 110° C., basic zinc carbonate is obtained, characterized by 43–46% $ZnCO_3$ and 58–59% Zn contents.

As anticipated, the analytical data indicates a virtual chemical identity between the above discussed commercial grade basic zinc carbonates and "$CO_2$ saturated" dehydrated precursors, corresponding approximately to the composition of $ZnCo_3 \cdot (1.4–1.6)Zn(OH)_2 \cdot (0.2–0.3) H_2O$.

Such "$Co_2$ saturated", dehydrated basic zinc carbonate reacts as expected, according to Reaction 5, displaying full "template" effect and constitutes active precursor of "altered" structure ZnNCN.

Curiously and in sharp contrast with the characteristics of dehydrated basic zinc carbonates (either commercial grades or dehydrated "$CO_2$ saturated"), freshly prepared "$CO_2$ saturated" $Zno/ZnCO_3$ suspensions, although do react predictably according to Reaction 5, unexpectedly yield, however, ZnNCN of "normal" structure, do not display typical "template" effect and consequently do not constitute precursor of "altered" structure ZnNCN. The upper limit of $ZnCO_3$ content which allows freshly formed $Zno/ZnCO_3$ suspensions to function as precursor of "altered" structure ZnNCN was found to be lower than the achievable saturation limit (about 46% by weight of the solid phase). Precursor composition suspensions considered preferable according to the present invention are characterized by 30–46% $ZnCO_3$ contents.

TABLE 2

| "Seed" Product and its $ZnCO_3$ Content in Weight % | Applied Minimal "Seeding" Ratio in Weight % | Precursors' $ZnCO_3$ Content in Weight % | Example # |
|---|---|---|---|
| Basic zinc carbonate Commercial Grade/42–43% | 13–14 | 5.6–6.0 | 5 |
| $H_2SO_4$ and $Na_2CO_3$ | 10 (mole %) | 12.5 (Determined) | 4 |
| Basic zinc carbonate Suspension (fresh)/ 42–43% | 14–15 | 7–8 | 6. |
| ZnNCN of "Altered" Structure/ 2–3% | 20–21 | 0.5–0.6 | 7. |

As expected, freshly formed and well dispersed basic zinc carbonate suspension was found to be a highly reactive precursor (in comparison with commercially available bulk products) which, pursuant to Reaction 5 performed at 70°–80° C., yields pigment grade ZnNCN of excellent quality, characterized by "altered" structure, comparatively high assay (87–90%), remarkably low $ZnCO_3$ (2.5–3.5%) and ZnO (1.5–4.5%) inclusion, and about 5% $H_2O$ content. (See Table 3, Example 2).

Notably, the low $ZnCO_3$ content of the ZnNCN final product, obtainable by the above disclosed procedure is consistent with the aforementioned statement, relevant to the freshly prepared basic zinc carbonate precursor suspensions' high reactivity and along with final product's observed low ZnO inclusion content, clearly indicates that Reaction 5 occurs practically to completion under the above specified optimal circumstances.

It will be observed that although it evidently favors the completion of Reaction 5, (yielding ZnNCN characterized by high assay, respectively, low $ZnCO_3$ and ZnO content) a high $ZnCO_3$ content (such as 55–57%) of the basic zinc carbonate precursor is not an absolute prerequisite of the "altered" structure formation process. As also mentioned above (see precursor preparation by $H_2SO_4/Na_2CO_3$ addition to ZnO suspension) a full manifestation of the "template" effect was observable exclusively however, with precursors prepared by limited $CO_2$ introduction into ZnO suspension, at comparatively very low, as low as 1,5–2,5% of $ZnCO_3$ contents (see Example 3).

Figure 1:
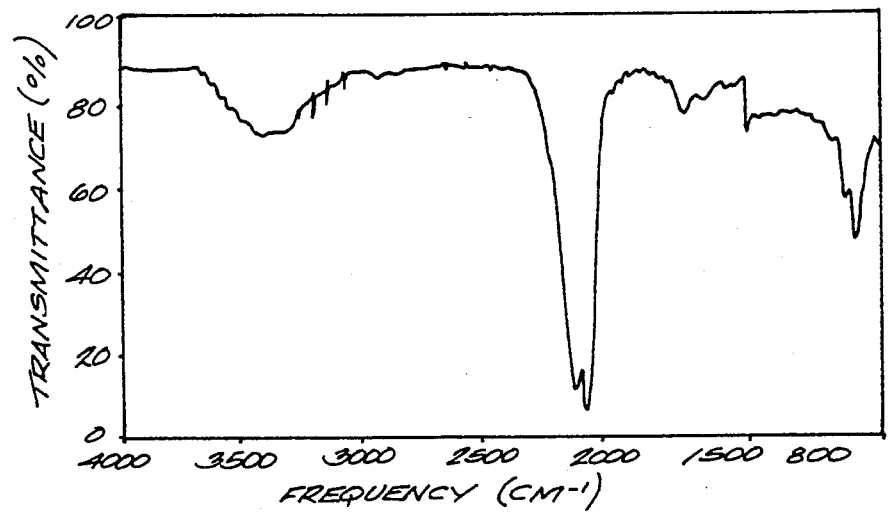
FIG. 1 is an IR spectrum characteristic for the crystal structure of prior art ZnNcN.

The intriguing aspect of the above observation, as it was surprisingly learned pursuant to the present invention, is that even high quality commercial grade ZnO generally contain a comparable level of about 0.5% $ZnCO_3$. It is essential to observe however, that such quality commercial grade ZnO, employed as raw material in a direct conversion process (see Reactions 3,4; Table 1 and FIG. 1) unequivocally yields ZnNCN of "normal" structure and, under similar circumstances, does not display "template" effect nor does it constitute a precursor for ZnNCN of "altered" structure.

Considering the aforementioned pertinent data, it becomes evident, there is a range of $ZnCO_3$ contents of approximately $2\% < ZnCO_3 < 46\%$ of freshly formed $ZnO/ZnCO_3$ suspensions, which following Reaction 5 allows the formation of "altered" structure ZnNCN. It is concluded that the presumed uniform distribution of freshly formed $ZnCO_3$, along the $ZnO/-ZnCO_3/$ liquid interface of the precursor, is the primary promoting factor of the "template" effect.

Noticeably, identical template effect as above-discussed, initially considered to be exclusively and specifically, related to the presence of the $ZnCO_3$ component of the solid phase, was also possible to be generated by seeding ZnO suspension with ZnNCN of "altered" structure at or above 20% weight ratio, and subsequently reacting the obtained mixture with $H_2NCN$ according to Reactions 3 and 4. As a matter of curiosity and in support of all previously presented considerations, it will be observed that "altered" structure ZnNCN is readily convertible into "normal" structure variety of the same, by solubilization in inorganic acidic medium and subsequent precipitation by neutralization, according to:

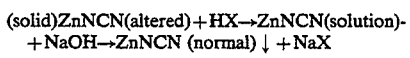

$$(\text{solid})\text{ZnNCN(altered)} + \text{HX} \rightarrow \text{ZnNCN(solution)} + \text{NaOH} \rightarrow \text{ZnNCN (normal)} \downarrow + \text{NaX} \qquad 10.$$

Where $X = Cl^-$ or $SO_4^{2-}$

"Template" effect observations in connection with precursors of low $ZnCO_3$ contents have indicated the possibility of precursor preparation, respectively to produce ZnNCN of "altered" structure by seeding ZnO suspensions with various $ZnCO_3$-containing "seed" products. Depending on the "seed" products' chemical composition and physical conditions, full "template" effect was obtainable at different minimal values of the seeding ratios (defined as the minimal weight % of the "seed" material per precursor necessary for full "template" effect) as presented in Table 2. Consequently, specifically prepared precursors, characterized by specific chemical composition and physical structure should be considered the distinctive "sine qua none" initial condition of the "altered" structure formation.

The logical consequence of the above considerations and experimental facts was the attempt to produce "mixed" grade ZnNCN, containing both the "normal" and "altered" structural varieties, for simplicity reasons, in approximately 1/1 weight ratio.

Such "mixed" grade ZnNCN of pigment quality was readily obtainable by dry or wet blending, in 1/1 weight ratio, of previously produced both "normal" and "altered" structural varieties. "Mixed" variety ZnNCN was preferably produced, however, by conversion, reacting adequately prepared $ZnO/ZnCO_3$ precursor, able to promote a partial "template" effect, with $H_2NCN$ in appropriate molar ratio. Both "normal" and "altered" structural varieties of ZnNCN can be simultaneously produced "in situ" as an intimate mixture.

Although any of the above presented seeding techniques (see Table 2) is considered applicable in this purpose, the adequate precursor preparation for "mixed" grade ZnNCN synthesis was preferably performed by seeding ZnO suspension with basic zinc carbonate of commercial grade, or alternatively with ZnNCN of "altered" structure. It is important to observe, however, that seeding purposely was performed at only 50% or less of the minimum value of the correspondent seeding ratio required to achieve a full "template" effect. (See Examples 8 and 9 and Table 3).

Figure 3:
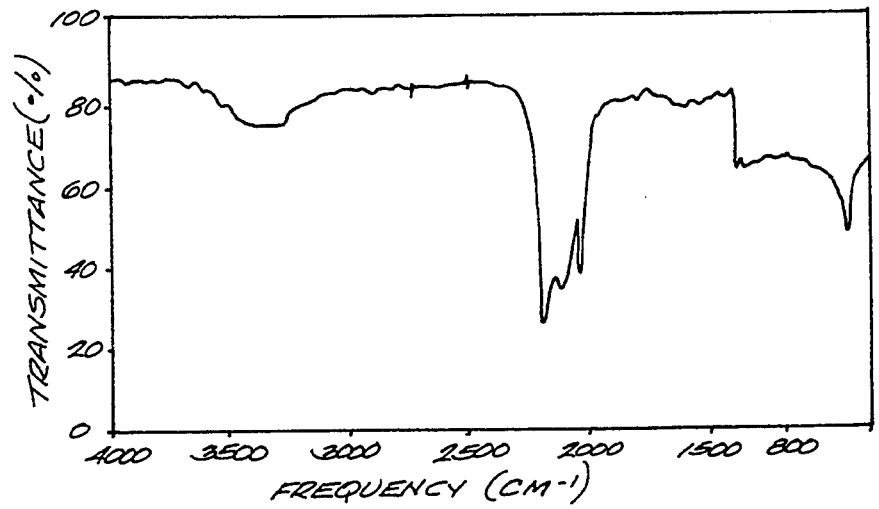
FIG. 3 is an IR spectrum characteristic of "mixed" grade ZnNCN.

Presented in FIG. 3 is an IR spectrum characteristic to such "mixed" grade ZnNCN which, as expected, displays all the typical features relevant to cyanamide structure; more importantly the presence of equally intense component absorption bands at 2050 $cm^{-1}$ and 2200 $cm^{-1}$, indicates that such "mixed" grade ZnNCN contains both the "normal" and "altered" structural varieties intimately mixed in approximately 1/1 weight ratios. Without any intention to limit the applicability of the present invention, specific examples subsequently described relate to practical realization of the above disclosed various techniques of precursor preparation, respectively, of the "altered" structure ZnNCN manufacturing procedure. All Examples where applicable, are limited, however to only one selected value of the related ranges of "seeding" ratios.

In order to minimize the final product's $ZnCO_3$ and ZnO inclusion content, optimal process conditions were preferentially applied (15% molar excess of $H_2NCN$, 70°-85° C. temperature range).

Soluble salt-free, stabilized aqueous solution of $H_2NCN$ was preferable employed as raw material, available commercially from S.K.W. of Germany. However, it is evident that such material prepared in accordance with Reaction 6 or its equivalent can alternatively be used. As for the process, a skilled chemist would realize, that other possible variations of Reaction 5 exist. For example, $ZnO/ZnCO_3$ preparation and ZnNCN synthesis can be carried out simultaneously, by concurrent introduction of $CO_2$ and $H_2NCN$ into previously prepared ZnO suspension. It is considered, however, that no particular advantage would be achieved in comparison with the essentially subsequential techniques described, i.e. in Examples 2 and 3. ZnNON of "altered" structure obtained according to the present invention is intended to be employed as a pigment component of a protective coating. Such coating compositions, incorporating pigment grade ZnNCN pursuant to the present invention, are based on organic polymers, such as alkyd, acrylic, epoxy or polyurethane resins, dissolved in organic solvents or emulsified in water.

As a functional component in protective coating systems, pigment grade ZnNCN according to the present invention, provides corrosion inhibitive performance and extended service life to the protected metallic substrates, such as silver.

EXAMPLE 1

Pigment grade ZnNCN characterized by "altered" crystal structure and related IR spectrum, respectively (See FIG. 2), was produced according to the procedure as follows:

A basic zinc carbonate ($ZnCO_3.2Zn(OH)_2.H_2O$ as available from Aldrich Chemical Co.) suspension was prepared by dispersing 0.5 moles (171.0 g.) of finely ground such material in 500 ml of intensively stirred hot water.

Surprisingly, the product's $ZnCO_3$ content experimentally was found to be 42–43%, (which is substantially higher than the expected theoretical value of 36.6%) and zinc content was determined to be 57.72%. Thus, the product's composition corresponds approximately to $ZnCO_3.1.6 Zn (OH)_2 .0.6H_2O$. The hydration and dispersing process of the solid phase was completed by keeping the suspension intensively stirred at 75°-80° C. for one hour. Pigment grade zinc cyanamide was produced by introducing, over 30 minutes, 1.73 moles (73.0 g.) of $H_2NCN$, as 25% aqueous solution, (soluble salt contaminant-free, technical grade, stabilized aqueous solution from S.K.W.-Germany) into the previously prepared, intensively stirred basic zinc carbonate suspension at 75°-85° C. The conversion process according to reaction 5 was finalized by keeping the same conditions (75°-85° C. intensive agitation) for 1.5 hours after the $H_2NCN$ introduction was completed. Subsequently, the resultant white precipitate was separated by vacuum filtration, the presscake obtained at approximately 50% solid content, was washed with 100 ml $H_2O$ at ambient temperature, dried at 105°-110° C. for 12 hours and pulverized to a fineness of 100% +270 mesh. The total amounts of recyclable process waters and final product recovered was approximately 700 ml and 152.0 g., respectively. Analytical data typical for pigment grade zinc cyanamide of altered structure, obtained pursuant to the procedure above disclosed, are presented in Table 3 (Column 1).

EXAMPLE 2

Zinc cyanamide of similar grade as specified in Example 1 was produced according to the following:

Highly reactive, well dispersed and hydrated ZnO suspension was prepared by introducing in small increments, 1.0 mole (81.4 g.) of AZO 66 grade ZnO (from American Smelting and Refining Co.) into 500 ml intensively stirred hot water. The dried product's $ZnCO_3$ content was determined to be ~0.5%. The dispersion and hydration process was completed by maintaining the same conditions for one hour at 75°-85° C. The continuously stirred ZnO suspension was first cooled to 20°-30° C. and subsequently converted into basic zinc carbonate suspension by $CO_2$ gas introduction (at approximative rate of 200 cm$^3$/min. for 50 min.). The $ZnCO_3$ content of such precursor suspension's solid phase typically was found to be 35–42%.

In order to produce pigment grade ZnNCN characterized by altered crystal structure, 1.15 moles (48.3 g.) of technical grade $H_2NCN$, as 25% aqueous solution was introduced gradually in 30–40 minutes into the intensively stirred, previously prepared basic zinc carbonate suspension at 75°-85° C. The reaction was completed by maintaining the same process conditions for two hours; the product was subsequently processed as specified in Example 1. The total amounts of recyclable process liquor and final product recovered were approximately 550 ml. and 103.0 g., respectively. Pertinent analytical data are presented in Table 3 (Column 2).

EXAMPLE 3

Zinc cyanamide of identical grade (characterized by IR spectrum presented in FIG. 2) as specified in Example 2 was produced in a similar fashion as disclosed in therein, except that the $ZnO/ZnCO_3$ precursor preparation was performed by a limited amount of $CO_2$ introduction. More specifically, while maintaining the process conditions as disclosed in Example 2, the duration of the $CO_2$ introduction into the ZnO suspension was limited to 3 minutes.

The $ZnCO_3$ content of such precursor's solid phase was typically found to be 2–3%. The total amounts of recyclable process waters and final product recovered were approximately 600 ml and 100.0 g., respectively. Relevant analytical data are presented in Table 3, Example 3.

TABLE 3

Analytical data typical for pigment grade ZnNCN of "altered" structure producible according to the present invention.

TABLE 3

Analytical data typical for pigment grade ZnNCN of "altered" structure producible according to the present invention.

| Analyzed or tested parameter | Example Numbers | | | | | | | | | Observation |
|---|---|---|---|---|---|---|---|---|---|---|
| | 1 | 2 | 3 | 4 | 5 | 6 | 7 | 8 | 9 | |
| Appearance: | White Amorphous Powder | | | | | | | | | |
| Zinc as Zn % | 60.4–59.6 | 59.1–58.5 | 61.0–61.1 | 60.5–61.0 | 61.2 | 57.9 | 61.6 | 60.3 | 60.4 | Determined |
| N as N % | 21.5–21.6 | 23.0–24.0 | 21.6–21.7 | 22.6–21.1 | 21.7 | 20.04 | 21.5 | 22.1 | 22.03 | Determined |
| $ZnCO_3$ % | 4.3–5.8 | 3.5–2.5 | 2.7–2.8 | 3.2 | 1.8 | 1.6 | 1.7 | 1.5 | 1.1 | Determined |
| ZnNCN % | 80.9–81.1 | 86.6–90.2 | 81.3–81.7 | 85.3–79.3 | 80.7 | 90.5 | 80.8 | 83.2 | 82.9–83.0 | Calculated |
| ZnO % | 9.9–7.8 | 4.4–1.5 | 11.4 | 7.5–12.5 | 12.0 | 1.1 | 13.2 | 9.8 | 10.5 | Calculated |
| Crystal $H_2O$ % | 4.9–5.3 | 5.4–5.8 | 4.3 | 4.1–4.9 | 5.5 | 6.9 | 4.2 | 5.5 | 5.5 | Calculated |
| Specific Gravity | | From 2.9 to 3.1 | → | → | | | | Not Determined | Not Determined | Determined |
| Apparent Bulk Density g/100 cm$^3$ | | From 32 to 42 | → | → | | | | Not Determined | Not Determined | ASTM D-1439-83 ADAPTED |
| Oil Absorption lbs/100 lbs. | | From 36 to 40 | → | → | | | | Not Determined | Not Determined | ASTM D-281-84 |

EXAMPLE 4

Pigment grade ZnNCN characterized by "altered" crystal structure was produced according to Reaction 5, as follows:

Highly reactive ZnO suspension containing 1 mole (81.38 g.) of such product was first prepared according to the procedure described in the relevant part of Example 2, and without cooling, partially converted into $ZnCO_3$. For that purpose, 0.1 moles of $H_2SO_4$ (10 g.) and after 5 minutes, 0.12 moles of $Na_3CO_3$ (13.0 g., as 25% aqueous solution) were slowly added to the intensively stirred ZnO suspension; the $ZnCO_3$ content of the obtained precursor was found to be 12.5% typically.

Pigment grade ZnNCN characterized by altered structure was produced by introducing, in 30 minutes, 1.15 moles of $H_2NCN$ as 25% aqueous solution, into the previously heated $ZnO/ZnCO_3$ suspension at 70°–80° C. The reaction was finalized by keeping the same conditions for 1.5 hours after the $H_2NCN$ addition was completed. Subsequently, the white precipitate separated by filtration, was extensively washed with 400 ml warm $H_2O$ (in order to minimize the undesirable soluble salt contaminant content, $Na_2SO_4$ in this case, of the final product) and further processed in identical fashion, as described in Example 1. The total amounts of recyclable process waters and final product recovered were approximately 700 ml and 102.0 g., respectively. Relevant analytical data are presented in Table 3 (Column 4).

EXAMPLE 5

Zinc cyanamide of similar grade as specified in Examples 1 and 2 was produced in a similar fashion as disclosed in Example 2 except that the ZnO suspension, (instead of being saturated with gas $CO_2$ introduction) was seeded in a 13% weight ratio (to 1 mole (81.4 g) ZnO, 12.2 g. basic zinc carbonate was added) at the moment of its preparation, with crystalline basic zinc carbonate identical to as specified in Example 1. The precursor suspension's solid phase $ZnCO_3$ content was calculated at 5.6%. The amount of $H_2NCN$ employed was adjusted to approximately 1.4 moles (58.7 g.). Analytical data typical for the final product recovered in a total amount of 113.0 g. are presented in Table 3, Column 5.

EXAMPLE 6

Zinc cyanamide of the same grade as specified in the previous examples was produced in a similar fashion as disclosed in Example 5, except that the ZnO suspension was seeded in a 15% weight ratio (to 1 mole Zno (81.6 g.) 14.5 g. basic zinc carbonate, with 42% $ZnCO_3$ content was added) at the moment of its preparation with the appropriate amount of basic zinc carbonate suspension freshly prepared by $CO_2$ saturation as disclosed in the related part of Example 2. The precursor suspension's solid phase $ZnCO_3$ content was calculated at 6.3%. Appropriate adjustment was made on the employed amount of $H_2NCN$ to 1.30 moles (54.5 g.). Pertinent analytical data typical for the final product recovered in a total amount of 116.0 g. are presented in Table 3, Column 6.

EXAMPLE 7

Pigment grade ZnNCN characterized by "altered" crystal structure and related IR spectrum was produced essentially in a similar fashion as presented in Example 5 except that the ZnO precursor suspension was seeded in a 20% weight ratio (to 1 mole Zno (81.6 g.), 20.5 g. ZnNCN was added) at the moment of its preparation by addition of freshly ground ZnNCN of "altered" structure, such as produced according to the process disclosed in Example 2. The amount of $H_2NCN$ used was approximately adjusted to 1.15 moles (48.3 g.). Pertinent analytical data characteristic for the product recovered in a total amount of 121.0 g. are presented in Table 3, Column 6.

EXAMPLE 8

Pigment grade ZnNCN of "mixed" structural variety, characterized by IR Spectrum presented in FIG. 3, was produced in the same fashion as presented in Example 5, except that the precursor preparation was performed by seeding ZnO suspension with commercial grade crystalline basic zinc carbonate, however at a 5.8% weight ratio (5.8 g. crystalline basic zinc carbonate added to 81.4 g. ZnO and reacted with 50.8 g. (1.2 moles) of $H_2NCN$ substantially lower than the minimum required for a full "template" effect. The total amount of ZnNCN of "mixed" grade recovered was approximately 106.0 g. Relevant analytical data typical for such pigment grade product are presented in Table 3, Column 8.

EXAMPLE 9

Pigment grade ZnNCN of "mixed" structure, characterized by IR spectrum as presented in FIG. 3 was produced in the same fashion as presented in Example #7, except that the precursor preparation was performed by seeding the ZnO suspension with ZnNCN of "altered" structure, however at 6.9% weight ratio (6.0 g. ZnNCN added to 81.4 g. ZnO and reacted with 48.3 g. (1.15 moles) of $H_2NCN$), considerably lower than the minimum needed for a complete "template" effect. The total amount of ZnNCN of "mixed" grade recovered was approximately 108.0 g. Relevant analytical data are presented in Table 3, column 9.

What is claimed is:

1. A pigment grade zinc cyanamide having enhanced corrosion preventive activity formed by a process comprising providing a hydrated slurry of finely divided, dispersed basic zinc carbonate, mixing with said slurry a stabilized aqueous solution of hydrogen cyanamide, said zinc cyanamide having a crystalline structure characterized by the presence of an intense IR absorption spectral band at 2200 $cm^{-1}$ and the substantial absence of component bands at 2050 $cm^{-1}$ and 700 $cm^{-1}$.

2. A composition according to claim 1 containing at least 92% active zinc cyanamide by weight.

3. A composition according to claim 1 wherein said zinc carbonate and said hydrogen cyanamide are substantially free of soluble inorganic salts.

4. Pigment grade open textured composition, having enhanced corrosion inhibitive activity, formed by a process comprising providing a hydrated aqueous slurry of finely divided, dispersed basic zinc carbonate, mixing with said slurry a stabilized aqueous solution of hydrogen cyanamide, said composition containing zinc cyanamide as major constituent of approximately 70-95 weight percent intimately associated with zinc carbonate as secondary constituent of approximately 1-10 weight percent.

5. Composition according to claim 4 essentially free of soluble inorganic salt contaminants, where said zinc cyanamide constituent has crystal structure characterized by the presence of an intense IR absorption spectral band at approximately 2200 $cm^{-1}$ and the substantial absence of spectral bands at approximately 2050 $cm^{-1}$ and 700 $cm^{-1}$.

6. A pigment grade open textured, porous zinc cyanamide having enhanced corrosion preventive activity substantially free of soluble inorganic salts having a crystalline structure characterized by the presence of an intense IR absorption spectral band at approximately 2200 $cm^{-1}$ and the substantial absence of spectral bands at approximately 2050 $cm^{-1}$ and approximately 700 $cm^{-1}$.

7. A method of producing pigment grade zinc cyanamide having enhanced corrosion preventive activity comprising providing a hydrated slurry of finely divided, dispersed basic zinc carbonate, mixing with said slurry a stabilized soluble aqueous solution of hydrogen cyanamide and reacting said ingredients to form zinc cyanamide having a crystalline structure characterized by the presence of an intense IR absorption spectral band at 2200 $cm^{-1}$ and the substantial absence of approximately component bands at approximately 2050 $cm^{-1}$ and 700 $cm^{-1}$.

8. A method according to claim 5 wherein said reaction is carried out at approximately 70° to 85° C.

9. A method according to claim 5 wherein said zinc carbonate is formed by injecting carbon dioxide into an agitated slurry of ZnO.

10. A method according to claim 7 wherein said zinc carbonate formation step is carried out at an elevated temperature of 70° to 85° C.

11. A method according to claim 7 wherein said basic zinc carbonate is formed by sulfuric acid and sodium carbonate addition to a ZnO slurry.

* * * * *